US010066696B2

(12) United States Patent
Takeuchi

(10) Patent No.: US 10,066,696 B2
(45) Date of Patent: Sep. 4, 2018

(54) DAMPER

(71) Applicant: KYB Corporation, Tokyo (JP)

(72) Inventor: Hideaki Takeuchi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/305,194

(22) PCT Filed: May 14, 2015

(86) PCT No.: PCT/JP2015/063931
§ 371 (c)(1),
(2) Date: Oct. 19, 2016

(87) PCT Pub. No.: WO2015/178287
PCT Pub. Date: Nov. 26, 2015

(65) Prior Publication Data
US 2017/0037922 A1 Feb. 9, 2017

(30) Foreign Application Priority Data

May 19, 2014 (JP) .................................. 2014-103013

(51) Int. Cl.
*F16F 9/36* (2006.01)
*B60G 15/06* (2006.01)
(Continued)

(52) U.S. Cl.
CPC .............. *F16F 9/362* (2013.01); *B60G 15/06* (2013.01); *F16F 9/19* (2013.01); *F16F 9/36* (2013.01); *B60G 2206/40* (2013.01); *F16F 9/061* (2013.01); *F16F 9/526* (2013.01); *F16F 2230/30* (2013.01)

(58) Field of Classification Search
CPC ...... F16F 9/36; F16F 9/362; F16F 9/58; F16F 9/585
See application file for complete search history.

(56) References Cited

U.S. PATENT DOCUMENTS 3,837,445 A     9/1974   Pierle
3,850,483 A * 11/1974   Roberts ..................... F16F 9/36
                                                         384/15
(Continued)

FOREIGN PATENT DOCUMENTS

DE     102013207130 A1 * 10/2014 ............. F16F 9/585
FR           2723624 A1    2/1996
(Continued)

OTHER PUBLICATIONS

Machine translation of Hegmann (DE 10 2013 207 130) (no date).*

*Primary Examiner* — Nicholas J Lane
(74) *Attorney, Agent, or Firm* — Rabin & Berdo, P.C.

(57) ABSTRACT

A damper includes a cylinder, an annular rod guide, a rod, an annular oil seal, and an annular seal holder. The cylinder internally forms an action chamber. The rod guide is secured to one side opening of the cylinder. The rod is inserted through an inner peripheral side of the rod guide so as to be axially movable. The oil seal is installed to the action chamber side of the rod guide to be slidably in contact with an outer peripheral surface of the rod. The seal holder supports the oil seal from the action chamber side. The rod guide includes a holding portion to hold the seal holder.

4 Claims, 5 Drawing Sheets

(51) Int. Cl.
  *F16F 9/19* (2006.01)
  *F16F 9/06* (2006.01)
  *F16F 9/52* (2006.01)

(56) References Cited

U.S. PATENT DOCUMENTS

| | | | | |
|---|---|---|---|---|
| 3,937,450 | A * | 2/1976 | Bauer | F16F 9/0227 |
| | | | | 267/113 |
| 6,253,661 | B1 * | 7/2001 | Fenn | F16F 9/3242 |
| | | | | 92/165 R |
| 6,390,258 | B1 * | 5/2002 | Hofmann | B60G 13/008 |
| | | | | 188/322.16 |
| 2008/0179149 | A1 * | 7/2008 | Strong | F16F 9/362 |
| | | | | 188/322.17 |
| 2009/0057081 | A1 * | 3/2009 | Moravy | F16F 9/362 |
| | | | | 188/379 |
| 2010/0116607 | A1 * | 5/2010 | Lun | F16F 9/362 |
| | | | | 188/267.2 |
| 2017/0074344 | A1 * | 3/2017 | Takeuchi | F16F 9/32 |
| 2017/0138432 | A1 * | 5/2017 | Takeuchi | F16F 9/362 |

FOREIGN PATENT DOCUMENTS

| | | |
|---|---|---|
| JP | H08-093826 A | 4/1996 |
| JP | H10115339 A | 5/1998 |
| JP | 4491818 B2 | 6/2010 |

* cited by examiner

US 10,066,696 B2

DAMPER

TECHNICAL FIELD

The present invention relates to a damper.

BACKGROUND ART

A damper is used to damp vibrations of, for example, a vehicle, a device, and a construction.

For example, as illustrated in FIG. 5, a damper 100 disclosed in U.S. Pat. No. 3,837,445B includes a cylinder 102, an annular rod guide 103, a rod 104, an annular oil seal 105, and an annular seal holder 106. The cylinder 102 internally forms an action chamber 101. The rod guide 103 is secured to one side opening of this cylinder 102. The rod 104 is inserted through an inner peripheral side of the rod guide 103 so as to be axially movable. The oil seal 105 is installed to the action chamber 101 side of the rod guide 103 to be slidably in contact with an outer peripheral surface of the rod 104. The seal holder 106 is disposed on the action chamber 101 side of this oil seal 105. This oil seal 105 seals an outer periphery of the rod 104 to prevent hydraulic oil housed inside the cylinder 102 from leaking. The seal holder 106 elastically supports a lip portion 107 of the oil seal 105, thus ensuring improving sealing performance with the oil seal 105.

SUMMARY OF INVENTION

As illustrated in FIG. 5, in the conventional damper, the oil seal 105 is inserted to the action chamber 101 side of the annular rod guide 103, and the seal holder 106 is stacked on the action chamber 101 side of the rod guide 103. A seat 109 is disposed below the seal holder 106 so as not to separate the rod guide 103, the oil seal 105, and the seal holder 106. A snap ring 108, which is disposed at the cylinder 102, restricts a movement of this seat 109. Therefore, to install the rod guide 103, the oil seal 105, the seal holder 106, and the seat 109 to the cylinder 102, these members are inserted into the cylinder 102 one by one in an order from the seat 109 disposed at the lowest. This increases a man-hour for installation, thereby causing a problem of complicated attachment work that inserts the oil seal 105 into the rod guide 103.

An object of the present invention is to provide a damper that ensures easing an assembly.

According to a certain aspect of the present invention, a damper includes a cylinder, an annular rod guide, a rod, an annular oil seal, and an annular seal holder. The cylinder internally forms an action chamber. The rod guide is secured to one side opening of the cylinder. The rod is inserted through an inner peripheral side of the rod guide so as to be axially movable. The oil seal is installed to the action chamber side of the rod guide to be slidably in contact with an outer peripheral surface of the rod. The seal holder supports the oil seal from the action chamber side. The rod guide includes a holding portion to hold the seal holder.

DESCRIPTION OF EMBODIMENTS

Figure 1:
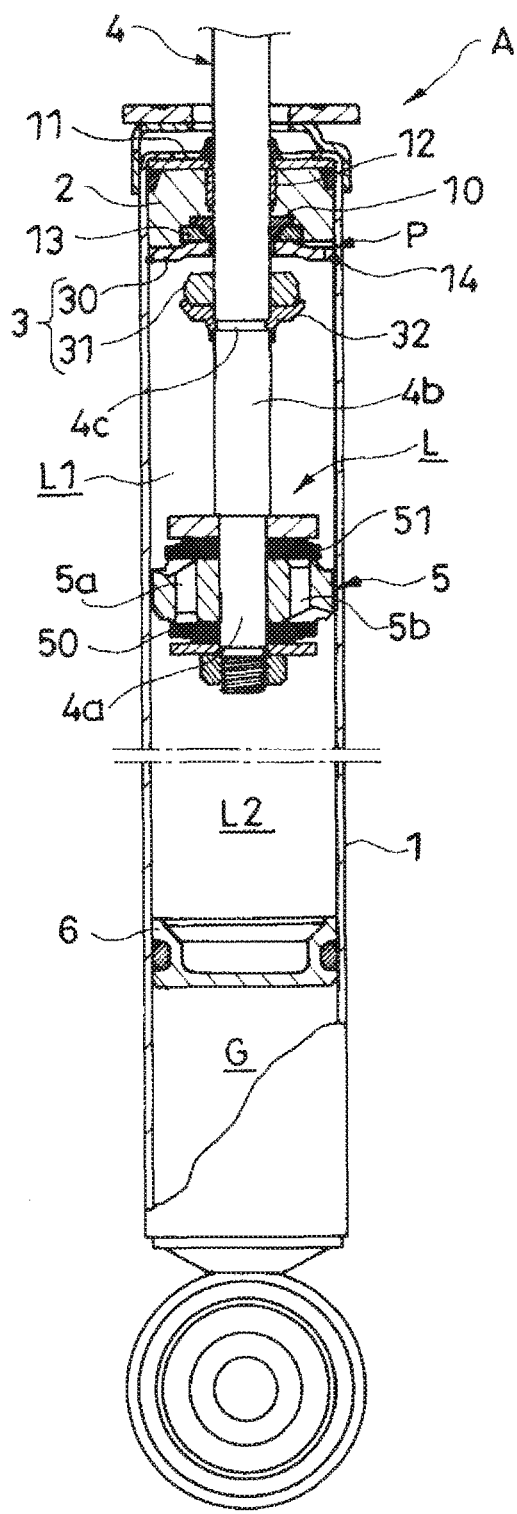
FIG. 1 is a front view illustrating a partially cut damper according to an embodiment of the present invention.

The following describes a damper according to one embodiment of the present invention with reference to the drawings. Like reference numerals designate corresponding or identical elements throughout some drawings.

Figure 2:
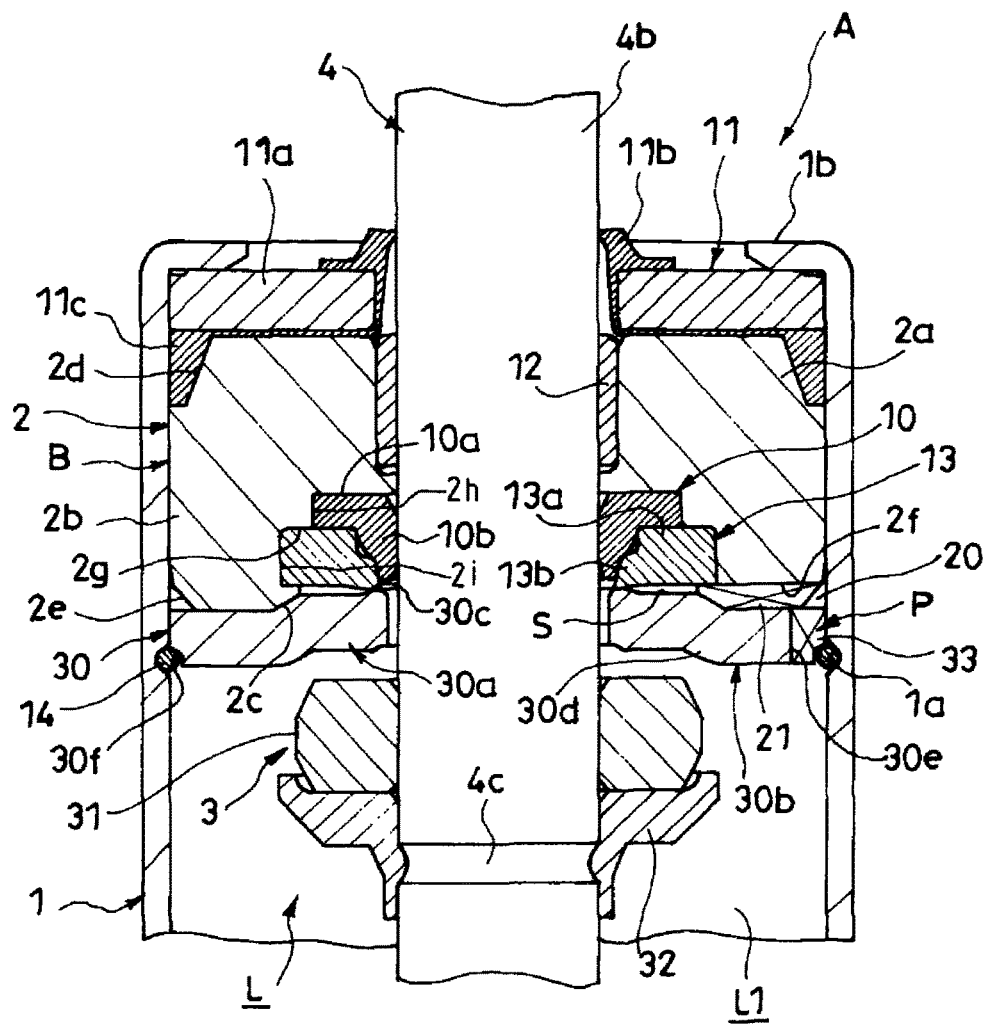
FIG. 2 is a drawing illustrating enlarged main parts in FIG. 1.

As illustrated in FIG. 1 and FIG. 2, a damper A according to the embodiment includes a cylinder 1, an annular rod guide 2, a rod 4, an annular oil seal 10, and an annular seal holder 13. The cylinder 1 internally forms an action chamber L. The rod guide 2 is secured to one side opening of this cylinder 1. The rod 4 is inserted through an inner peripheral side of the rod guide 2 so as to be axially movable. The oil seal 10 is installed to the action chamber L side of the rod guide 2 to be slidably in contact with an outer peripheral surface of the rod 4. The seal holder 13 supports this oil seal 10 from the action chamber L side. The rod guide 2 includes claws 2c, holding portions, to hold the seal holder 13.

The following gives the description in detail. The damper A according to the embodiment is used for a vehicle such as an automobile. Especially, when used for the vehicle, the cylinder 1 is coupled to a wheel side, and a projecting end portion of the rod 4, which projects from the cylinder 1, is coupled to a vehicle body side. Especially, the damper A is disposed at the vehicle so as to erect. Accordingly, when an impact due to uneven road surface is input to the wheel, the rod 4 moves into and out of the cylinder 1, thus the entire damper A extends and contracts.

It should be noted that, the damper A may be used for a vehicle other than the automobile, a device, a construction, and a similar structure. The damper A may be disposed at the vehicle so as to stand upside-down where the cylinder 1 is coupled to the vehicle body side and the rod 4 is coupled to the wheel side.

As illustrated in FIG. 1, the embodiment forms the cylinder 1 with a shape of a cylinder with a closed bottom. The annular rod guide 2 is secured to the upper opening of this cylinder 1. Furthermore, the rod 4 penetrates the rod guide 2 and moves into and out of the cylinder 1. Furthermore, the damper A includes a piston 5, a free piston 6, and a rebound member 3. The piston 5 is held to a lower end portion of the rod 4 and slidably in contact with the inner peripheral surface of the cylinder 1. The free piston 6 is slidably in contact with the inner peripheral surface on a side opposite from the rod on the cylinder 1. The rebound member 3 reduces an impact while the damper A extends the most. The free piston 6 partitions the cylinder 1 into the above-described action chamber L filled with hydraulic oil and a gas chamber G that seals gas.

The gas chamber G swells and contracts through a movement of the free piston 6 in an axial (vertical) direction. This can compensate for a change in an inner volume of the cylinder by a volume of an appearance of the rod 4 in association with extending and contracting the damper A and a change in volume of the hydraulic oil due to temperature change.

In detail, during the extension operation of the damper A where the rod 4 moves out of the cylinder 1, the free piston 6 moves upward and the gas chamber G enlarges. This ensures compensating for an increase in cylinder inner volume by the volume of the rod 4 moving out with the gas chamber G. Inversely, during the compression operation of the damper A where the rod 4 moves into the cylinder 1, the free piston 6 moves downward and the gas chamber G contracts. This ensures compensating for the reduction in cylinder inner volume by the volume of the rod 4 moving into with the gas chamber G. In the case where the volume of hydraulic oil expands due to a temperature rise, the free piston 6 moves downward and the gas chamber G contracts. In the case where the volume of hydraulic oil contracts due to a temperature reduction, the free piston 6 moves upward and the gas chamber G enlarges.

It should be noted that, the damper A according to the embodiment includes the gas chamber G configured to be a mono-tube type. However, instead of the gas chamber G, a reservoir may be disposed outside the cylinder 1 to seal the hydraulic oil and the gas, and the reservoir may compensate for the change in cylinder inner volume and the change in volume of the hydraulic oil. Especially, in this case, an outer pipe may be disposed on an outer periphery of the cylinder 1 to configure the damper A as a twin-tube type, and the reservoir may be formed between the cylinder 1 and the outer pipe. The liquid filling the action chamber L may be other than the hydraulic oil. As long as a damping force can be generated, the liquid can be appropriately changed.

The action chamber L is partitioned into an extension-side chamber L1, which is on the rod 4 side across the piston 5 (upward in the drawing) and a contraction-side chamber L2, which is on a side opposite from the rod 4 across the piston 5 (downward in the drawing). The piston 5 forms an extension-side passage 5a and a contraction-side passage 5b, which communicate between the extension-side chamber L1 and the contraction-side chamber L2. A lower-portion-side leaf valve 50 to open and close the extension-side passage 5a is stacked on a lower portion side of the piston 5. An upper-portion-side leaf valve 51 to open and close the contraction-side passage 5b is stacked on an upper portion side of the piston 5.

The lower-portion-side leaf valve 50 functions as an extension-side damping valve that opens the extension-side passage 5a only during the extension operation of the damper A and provides a resistance to a flow of the hydraulic oil passing through this extension-side passage 5a. Meanwhile, the upper-portion-side leaf valve 51 functions as a contraction-side damping valve that opens the contraction-side passage 5b only during the compression operation of the damper A and provides a resistance to a flow of the hydraulic oil passing through this contraction-side passage 5b.

With the configuration, during the extension operation of the damper A, the hydraulic oil in the contracted extension-side chamber L1 opens the lower-portion-side leaf valve 50, passes through the extension-side passage 5a, and moves to the enlarged contraction-side chamber L2. Accordingly, the damper A generates an extension-side damping force caused by the resistance of the lower-portion-side leaf valve 50 when the hydraulic oil passes through the extension-side passage 5a. Inversely, during the compression operation of the damper A, the hydraulic oil in the contracted contraction-side chamber L2 opens the upper-portion-side leaf valve 51, passes through the contraction-side passage 5b, and moves to the enlarged extension-side chamber L1. Accordingly, the damper A generates a contraction-side damping force caused by the resistance of the leaf valve 51 when the hydraulic oil passes through the contraction-side passage 5b.

It should be noted that, in the embodiment, the damper A is configured to generate the damping forces on the extension side and the contraction side caused by the resistances of the leaf valves 50 and 51. However, the configuration to provide the resistance to the flow of the hydraulic oil moving between the extension-side chamber L1 and the contraction-side chamber L2 can be appropriately changed. For example, poppet valves, orifices, and similar members may substitute for the leaf valves 50 and 51. In this embodiment, since the upper-portion-side leaf valve 50, which generates the damping force on the extension side, and the upper-portion-side leaf valve 51, which generates the damping force on the contraction side, are separated, this allows individually setting the damping forces on the extension side and the contraction side. However, one valve that allows a bidirectional flow of the hydraulic oil may be able to generate the damping forces both on the extension side and the contraction side.

The rod 4 coupled to the piston 5 includes a mounting portion 4a and a shaft portion 4b. The mounting portion 4a with small diameter holds the piston 5 to its outer periphery. The shaft portion 4b extends upward from this mounting portion 4a, penetrates the extension-side chamber L1, and projects to the outside of the cylinder 1. An annular groove 4c is formed on an outer periphery of the shaft portion 4b along a circumferential direction in the cylinder 1. An annular stopper 32 is fitted to this groove 4c. To the annular stopper 32, an annular rebound cushion 31 is supported. This rebound cushion 31 is made of an elastic body such as rubber and constitutes the rebound member 3 together with a seat 30, which will be described later. Furthermore, the rebound cushion 31 bumps against the seat 30 when the damper A extends the most and elastically deforms to reduce an impact at the most extension.

Figure 3:
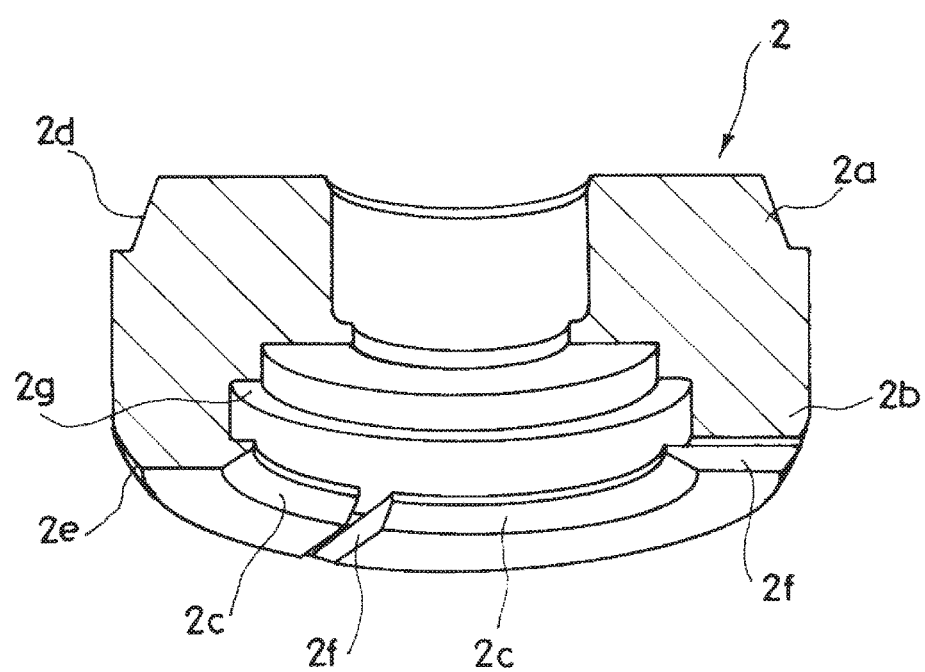
FIG. 3 illustrates an enlarged perspective view of a vertically cut-off rod guide of the damper according to the embodiment of the present invention.

The shaft portion 4b of the rod 4 penetrates the annular rod guide 2 secured to the upper opening of the cylinder 1. As illustrated in FIG. 2 and FIG. 3, this rod guide 2 includes an annular main body 2a, an annular case 2b, and three arc-shaped claws 2c on the identical circumference. The case 2b is continuous with the lower portion of this main body 2a. The claw 2c projects out from an inner periphery of the lower end portion of this case 2b to a center side of this case 2b. The main body 2a is formed into an approximately truncated cone shape. An outer periphery of the main body 2a is formed as an inclined surface 2d inclined such that the diameter gradually decreases toward the upper end. The lower portion of the annular case 2b is formed into an approximately truncated cone shape. An outer periphery of the case 2b is formed as an inclined surface 2e inclined such that the diameter gradually decreases toward the lower end. That is, the inclined surface 2e inclines in the inverse direction to the inclined surface 2d. Furthermore, at a lower portion of the case 2b, a bottom groove 2f is formed along the cylinder radial direction from the outer peripheral end to the inner peripheral end. This bottom groove 2f is formed as a clearance (an opening) between the adjacent claws 2c.

As illustrated in FIG. 2, a sealing member 11 to seal the outer periphery of the rod 4 and the inner periphery of the cylinder 1 is stacked on the upper side of the main body 2a in the rod guide 2. An annular bearing 12 is fitted to the inner periphery of the main body 2a to movably journal the rod 4 in the axial direction. Meanwhile, to the inner periphery of the case 2b, an oil seal 10 to seal the outer periphery of the rod 4 and the seal holder 13 are held. The annular seat 30 is stacked on the lower side (the action chamber L side) of the case 2b.

The sealing member 11, which is stacked on the upper side of the main body 2a, is constituted of an annular plate-shaped insert metal 11a and a rubber portion (not indicated by reference numeral), which coats this insert metal 11a. This rubber portion is constituted of an annular dust seal 11b and an annular outer peripheral seal 11c. The dust seal 11b inclinedly extends from the inner peripheral portion of the insert metal 11a to upward. The outer peripheral seal 11c extends from the outer peripheral portion of the insert metal 11a to downward. The dust seal 11b is slidably in contact with the outer peripheral surface of the shaft portion 4b of the rod 4 to seal the outer periphery of the rod 4, thus preventing a foreign matter from an external air side from mixing into the cylinder 1. Meanwhile, the outer peripheral seal 11c closely contacts the inclined surface 2d on the rod guide 2 and the inner peripheral surface of the cylinder 1 to prevent the hydraulic oil in the cylinder 1 from leaking to the external air side.

The case 2b in the rod guide 2 has a small-diameter portion 2h and a large-diameter portion 2i whose inner diameters differ in the middle. A stepped surface 2g is disposed at a boundary between the small-diameter portion 2h and the large-diameter portion 2i. In detail, the small-diameter portion 2h is disposed on a side opposite from the action chamber L with respect to the large-diameter portion 2i. The stepped surface 2g faces the action chamber L. The annular oil seal 10 is inserted into the small-diameter portion 2h in the case 2b. The annular seal holder 13 is press-fitted to the large-diameter portion 2i in the case 2b.

The oil seal 10 is made of an elastic member (fluorine-containing rubber (FKM)) and includes an annular base portion 10a and an annular lip portion 10b. The lip portion 10b inclinedly extends from the inner periphery of this base portion 10a to downward. A slidable contact of this lip portion 10b with the outer peripheral surface of the shaft portion 4b of the rod 4 seals the outer periphery of the rod 4, thus preventing the hydraulic oil in the cylinder 1 from leaking to the external air side. Meanwhile, the seal holder 13 is made of an elastic member (nitrile rubber (NBR)) and includes an annular press-fitted portion 13a and an annular supporting portion 13b. The supporting portion 13b extends from the lower inner periphery of this press-fitted portion 13a to the center side in the cylinder radial direction. This press-fitted portion 13a presses the base portion 10a of the oil seal 10, thus retaining the oil seal 10. The supporting portion 13b elastically supports the outer periphery of the lip portion 10b.

It should be noted that, materials and shapes of the oil seal 10 and the seal holder 13 can be appropriately changed. With the embodiment, the oil seal 10 is separated from the dust seal 11b and is disposed on the action chamber L side with respect to the bearing 12. In view of this, even if a foreign matter passes through the dust seal 11b, the bearing 12 can also restrain the movement of this foreign matter to the action chamber L side. Therefore, the foreign matter is difficult to reach the oil seal 10, thus restraining a damage in the oil seal 10 by the foreign matter and ensuring improving a period of the use of the oil seal 10. The oil seal 10 is slidably in contact with an outer peripheral surface of a part between the piston 5 and the bearing 12 in the rod 4. This part is a part less likely to deflect even if an external force acts sideways on the rod 4. Therefore, the lip portion 10b of the oil seal 10 is less likely to be separate from the outer peripheral surface of the rod 4, ensuring an excellent sealing property with the oil seal 10. Further, the oil seal 10 is separated from the dust seal 11b to be different bodies; therefore, to form these members, materials appropriate for the respective members are easily selected.

Figure 4:
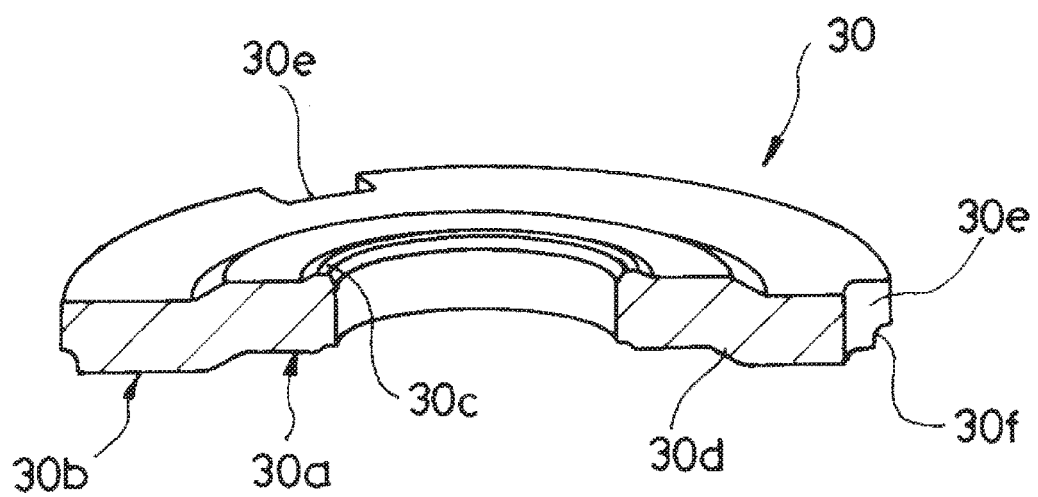
FIG. 4 illustrates an enlarged perspective view of a vertically cut-off seat of the damper according to the embodiment of the present invention.
Figure 5:
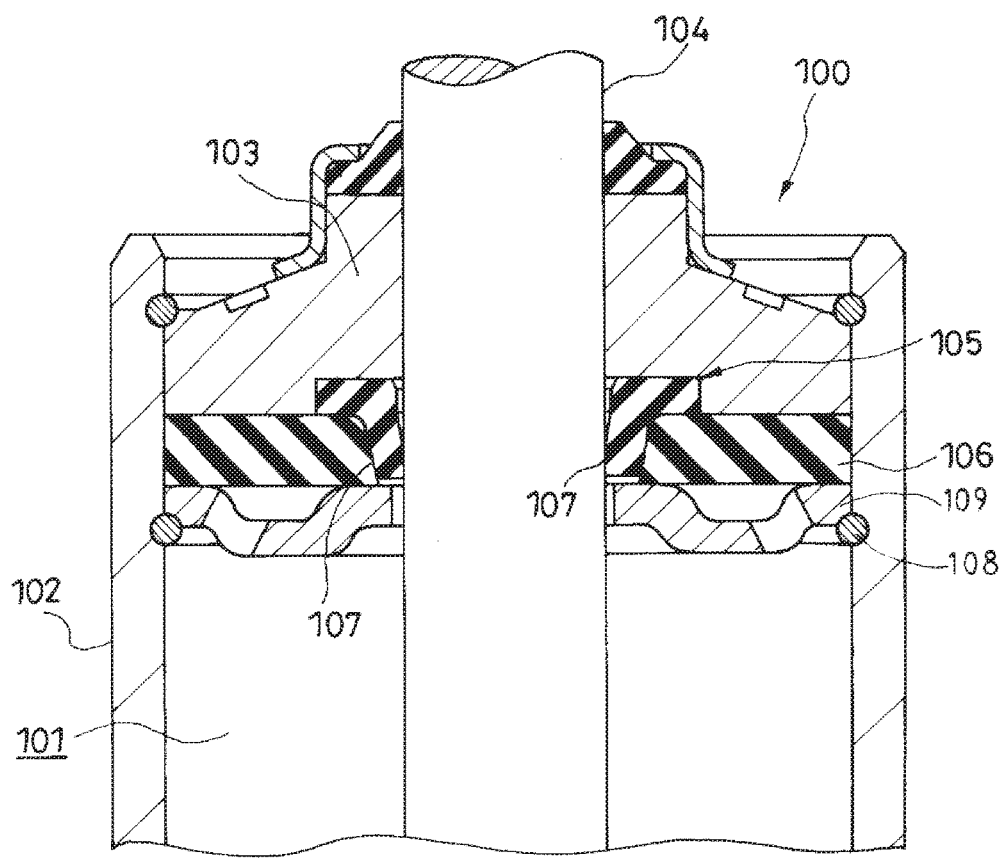
FIG. 5 is a vertical cross-sectional view illustrating enlarged main parts of a conventional damper.

The shaft portion 4b of the rod 4 is inserted through the inner peripheral side of the annular seat 30 stacked on the lower side of the rod guide 2. As described above, the seat 30 constitutes the rebound member 3 together with the rebound cushion 31. As illustrated in FIG. 2 and FIG. 4, this seat 30 includes an annular plate-shaped butting portion 30a against which the rebound cushion 31 bumps and an annular plate-shaped outer peripheral portion 30b, which is disposed on the outer peripheral side of this butting portion 30a.

In the embodiment, an inner peripheral part 30c of the butting portion 30a slightly bulges upward and is brought into contact with a lower surface on the inner peripheral portion of the supporting portion 13b in the seal holder 13. It should be noted that, since the bulging of the inner peripheral part 30c of the butting portion 30a is gradual, a hollow of the butting portion 30a on a side opposite from the bulge on the inner peripheral part 30c also makes a level difference formed on the butting portion 30a gradual. Accordingly, even if the rebound cushion 31 collides with the butting portion 30a, it is arranged that the level difference in the butting portion 30a does not damage the rebound cushion 31. The butting portion 30a includes a tapered portion 30d that inclines along a taper of the claw 2c. Accordingly, the butting portion 30a slightly bulges upward from the outer peripheral portion 30b.

The outer peripheral portion 30b is brought into contact with a lower end surface of the case 2b in the rod guide 2. On the outer peripheral side of the outer peripheral portion 30b, a plurality of cutouts 30e are circumferentially arranged. Furthermore, a hook groove 30f hooked to a retaining ring 14 is formed at the lower portion of the outer peripheral portion 30b. As illustrated in FIG. 2, the cutouts 30e are opposed to the inclined surface 2e formed on the lower outer periphery of the case 2b.

A communication passage P is constituted of a vertical passage 33, an annular passage 20, a lateral passage 21, and the clearance (not indicated by reference numeral). The vertical passage 33 is formed between the cutouts 30e and the cylinder 1. The annular passage 20 is formed between the inclined surface 2e and the cylinder 1. The lateral passage 21 is formed between the bottom groove 2f and the outer peripheral portion 30b of the seat 30. The clearance is formed between the claw 2c and the claw 2c. In the embodiment, this communication passage P communicates between the action chamber L and a clearance S formed between the seal holder 13 and the butting portion 30a of the seat 30 to transmit a pressure in the action chamber L to the oil seal 10.

In detail, the above-described communication passage P communicates between the clearance S, which is formed between the seal holder 13 and the seat 30, and the action chamber L. Accordingly, pressurizing the action chamber L by compressing and sealing the gas in the gas chamber G also pressurizes the clearance S. This pressure compresses the seal holder 13. This compression reduces the diameter of the supporting portion 13b of the seal holder 13 and the force of fastening the lip portion 10b of the oil seal 10 strengthens. That is, the pressure in the action chamber L is transmitted to the seal holder 13 via the communication passage P and the clearance S. The seal holder 13 pushes the oil seal 10 to the rod guide 2 side. This strengthens the force of pressing the lip portion 10b of this oil seal 10 to the outer peripheral surface of the rod 4, thus ensuring enhancing the sealing performance with the oil seal 10.

In the embodiment, the bottom groove 2f and the clearance formed between the claw 2c and the claw 2c are disposed on the identical straight line, and these bottom groove 2f and clearance are circumferentially disposed at regular intervals, thereby ensuring applying a uniform pressure to the seal holder 13. However, the configuration of the communication passage P can be appropriately changed.

The three arc-shaped claws 2c are arranged on the identical circumference in the rod guide 2. A diameter of a circle connecting inner peripheral ends of these claws 2c is formed smaller than an inner diameter of the large-diameter portion 2i in the case 2b and is formed larger than an inner diameter of the small-diameter portion 2h. Accordingly, to insert the oil seal 10 into the case 2b, the oil seal 10 is not hooked to the claws 2c. Subsequent to the oil seal 10, fitting the elastically deformed seal holder 13 to the upper side of the claws 2c retains the seal holder 13 with the claws 2c.

It should be noted that, lengths of the three claws 2c may differ from one another. In this case as well, it is necessary that the diameter of the circle connecting the inner peripheral ends of the claws 2c is in a range of smaller than the inner diameter of the large-diameter portion 2i in the case 2b and larger than the inner diameter of the small-diameter portion 2h. However, the three claws 2c with respective different lengths make the processing complicated; therefore, it is preferable to simplify the processing with the three claws 2c with all identical length.

As described above, the press-fitted portion 13a of the seal holder 13 presses the base portion 10a of the oil seal 10. Thus, the oil seal 10 is configured so as not to come off from the case 2b as long as the seal holder 13 does not come off. This ensures retaining both the oil seal 10 and the seal holder 13 with the claws 2c. The lower surfaces of the claws 2c are tapered inclining upward to the center side in the cylinder radial direction; therefore, the seal holder 13 elastically deforms while guided by these taper-shaped lower surfaces. This easily fits the seal holder 13 to the upper sides of the claws 2c.

It should be noted that, the shape, the number, and the arrangement of the claws 2c can be appropriately changed. For example, the claw 2c may be formed into an annular shape, and the bottom groove 2f may extend up to the inner peripheral end of the claw 2c. In the embodiment, the claws 2c are equivalent to the holding portions to hold the seal holder 13; however, the configuration of the holding portions is not limited to the claws 2c. For example, instead of the claw 2c, a groove may be disposed on the inner periphery at the lower end portion of the case 2b of the rod guide 2, and the holding portion may be configured as a retaining ring to be fitted to this groove. That is, it is only necessary for the holding portion to have a structure with which the seal holder 13 can be held to the rod guide 2.

The following describes a method for assembling the damper A according to the embodiment.

First, the bearing 12 is inserted into the main body 2a of the rod guide 2. The seal holder 13 is inserted into the case 2b subsequent to the oil seal 10. Thus, a rod guide assembly B is configured with the rod guide 2, the bearing 12, the oil seal 10, and the seal holder 13. This rod guide assembly B avoids the bearing 12 to be separated from the rod guide 2 by fitting. As described above, the claws 2c retain the oil seal 10 and the seal holder 13 so as not to be separate from the rod guide 2.

Next, the retaining ring 14 is fitted to a groove 1a, which is formed along the circumferential direction on the inner periphery of the cylinder 1. The seat 30, the rod guide assembly B, and the sealing member 11 are stacked in this order on the upper side of the retaining ring 14. Crimping an upper end portion 1b of the cylinder 1 to the inside secures the stacked seat 30, rod guide assembly B, and sealing member 11 to the upper opening of the cylinder 1.

This method for assembling the damper A can avoid the rod guide 2, the oil seal 10, and the seal holder 13 to be separated with the holding portions formed of the claws 2c. Accordingly, the rod guide 2, the bearing 12, the oil seal 10, and the seal holder 13 can be integrally treated as one component, the rod guide assembly B.

This eliminates a need for separately inserting the rod guide 2, the bearing 12, the oil seal 10, and the seal holder 13 in order to the cylinder 1 one by one. The insertion of the preliminarily assembled rod guide assembly B into the cylinder 1 completes the attachment. This ensures reducing the man-hour for installation to the cylinder 1, easing the assembly of the damper A. After a confirmation that all members have been attached through a visual check of the rod guide assembly B, the rod guide assembly B can be attached to the cylinder 1, thereby allowing preventing a failure such as an omission of attachment.

The following describes operational advantages of the damper A according to the embodiment.

In the embodiment, the dust seal 11b is integrated with the outer peripheral seal 11c. Thus integrating the dust seal 11b with the outer peripheral seal 11c ensures easier assembly work of the damper A.

It should be noted that, the dust seal 11b and the outer peripheral seal 11c may be separate. In this case, for example, the outer peripheral seal 11c may be formed into an annular O-ring. For example, a groove may be formed on the outer periphery of the rod guide 2. The outer peripheral seal 11c formed into the above-described annular O-ring may be fitted to this groove.

In the embodiment, the seat 30 is brought into contact with the rod guide 2. This allows the rod guide 2, a strength member, to receive a load when the rebound cushion 31 is bumped against the seat 30 (hereinafter referred to as a rebound load), ensuring thinning the thickness of the seat 30.

It should be noted that, the seat 30 may be separated from the rod guide 2 to receive the rebound load by the seat 30 alone. However, in this case, the seat 30 needs to be set to have a high strength so as to endure a large load. Furthermore, this needs to secure the seat 30 and the rod guide 2 individually to the cylinder 1, making the structure complicated.

In the embodiment, the inclined surface 2e is formed on the outer periphery of the rod guide 2. The diameter of the inclined surface 2e gradually decreases toward the seat 30 side end (the lower end), and the inclined surface 2e is opposed to the cutout 30e. Additionally, the bottom groove 2f is formed along the radial direction on the seat 30 side (the lower portion) of the rod guide 2. The communication passage P includes the annular passage 20, which is formed between the inclined surface 2e and the cylinder 1, and the lateral passage 21, which is formed between the bottom grooves 2f and the seat 30.

With the configuration, even if the positions of the cutouts 30e and the bottom grooves 2f are not matched, the vertical passage 33, which is formed with the cutout 30e, can communicate with the lateral passage 21, which is formed between the bottom grooves 2f and the seat 30, via the annular passage 20, easing the assembly of the damper A. It should be noted that, as long as the positions of the cutouts 30e and the bottom grooves 2f are matched so as to always ensure the communication between the vertical passage 33 and the lateral passage 21, the annular passage 20 may be dispensed with.

In the embodiment, the cutout 30e is formed on the outer peripheral side of the seat 30. The communication passage P includes the vertical passage 33 formed of the cutout 30e.

With the configuration, the openings on the communication passage P on the action chamber L side can be close to the outer peripheral side as much as possible, thereby ensuring improving a freedom of design of the rebound cushion 31. It should be noted that, the configuration of the communication passage P and the shape of the seat 30 are not limited to the ones described above. As long as the rebound cushion 31 is configured so as not to overlap the openings on the communication passage P on the action chamber L side, the configurations can be appropriately changed.

In the embodiment, the openings on the communication passage P on the action chamber L side (the cutouts 30e) are disposed on the outer peripheral side with respect to the part (the butting portion 30a) of the seat 30 against which the rebound cushion 31 bumps.

Even in the case where the communication passage P passes through the seat 30 and the rebound cushion 31, which is installed to the outer periphery of the rod 4, bumps against the seat 30, the above-described configuration can smooth the surface of the seat 30 receiving the rebound cushion 31 as much as possible. This restrains the damage in the rebound cushion 31, thereby ensuring stretching the rebound cushion 31.

In the embodiment, the case 2b includes the large-diameter portion 2i on the action chamber L side and the small-diameter portion 2h on the side opposite from the action chamber L. The inner diameter of the small-diameter portion 2h is smaller than the inner diameter of the large-diameter portion 2i. The oil seal 10 is inserted into the small-diameter portion 2h while the seal holder 13 is press-fitted to the large-diameter portion 2i. The claw 2c is formed into the arc shape or the annular shape. The diameter of the circle connecting the inner peripheral ends of the claws 2c is formed smaller than the inner diameter of the large-diameter portion 2i and is larger than the inner diameter of the small-diameter portion 2h.

With the configuration, as illustrated in FIG. 3, to insert the oil seal 10 into the case 2b, the oil seal 10 is not hooked to the claws 2c. It should be noted that, the shape and the number of the claws 2c are not limited to ones described above. For example, the claw 2c may be formed into an annular shape.

In the embodiment, the surface of the claw 2c on action chamber L side is tapered so as to incline in the direction opposite from the action chamber L to the center side of the case 2b.

With the configuration, the seal holder 13 is guided by the tapered surfaces formed on the claws 2c on the action chamber L side; therefore, the seal holder 13 is easily fitted to the sides of the claws 2c opposite from the action chamber L. It should be noted that, the claw 2c may not be tapered.

The embodiment forms the annular case 2b in the rod guide 2 on the action chamber L side. The case 2b houses the oil seal 10 and the seal holder 13. The holding portions are the claws 2c projecting out from the inner periphery at the end portion on the action chamber L side of the case 2b to the center side of the case 2b.

With the configuration, the case 2b has the form of covering the oil seal 10 and the seal holder 13. Accordingly, in the case where the oil seal 10, the seal holder 13, and the rod guide 2 are assembled and treated as one component, this configuration allows preventing the oil seal 10 and the seal holder 13 from being damaged.

It should be noted that, the configuration of the holding portion is not limited to the claw 2c. For example, instead of the claw 2c, a groove may be disposed on the lower end portion of the case 2b of the rod guide 2. The groove may include a retaining ring to hook and support the seal holder 13. That is, it is only necessary that the holding portion has the structure of holding the seal holder 13.

In the embodiment, the damper A includes the cylinder 1, the annular rod guide 2, the rod 4, the annular oil seal 10, and the annular seal holder 13. The cylinder 1 internally forms the action chamber L. The rod guide 2 is secured to one side opening of this cylinder 1. The rod 4 is inserted through the inner peripheral side of the rod guide 2 so as to be axially movable. The oil seal 10 is installed to the action chamber L side of the rod guide 2 to be slidably in contact with the outer peripheral surface of the rod 4. The seal holder 13 supports this oil seal 10 from the action chamber L side. The rod guide 2 includes the claws (the holding portions) 2c to hold the seal holder 13.

With the configuration, the claws (the holding portions) 2c ensure integrating the seal holder 13, the oil seal 10, and the rod guide 2 and installing the members to the cylinder 1 as the rod guide assembly B, thereby ensuring easing the assembly of the damper A.

Although the embodiment of the present invention has been described above, the above embodiment is merely an illustration of one application example of the present invention and not of the nature to limit the technical scope of the present invention to the specific configuration of the above embodiment.

The present application claims a priority of Japanese Patent Application No. 2014-103013 filed with the Japan Patent Office on May 19, 2014, and all the contents of which are hereby incorporated by reference.

The invention claimed is:
1. A damper comprising:
   a cylinder that internally forms an action chamber;
   an annular rod guide secured to one side opening of the cylinder;
   an annular seat secured to the rod guide on an action chamber side;
   a rod inserted through inner peripheral sides of the rod guide and the seat in the cylinder so as to be axially movable;
   an annular oil seal installed to the action chamber side of the rod guide to be slidably in contact with an outer peripheral surface of the rod;
   an annular seal holder configured to support the oil seal from the action chamber side; and
   a rebound cushion installed to an outer periphery of the rod, the rebound cushion bumping against the seat at a most extension, wherein
   the rod guide includes a holding portion to hold the seal holder, an annular case is formed in the rod guide on the action chamber side,
   the case houses the oil seal and the seal holder, and
   the holding portion is a claw projecting out from an inner periphery at an end portion on the action chamber side of the case to a center side of the case,
   the seal holder is made of an elastic member, and
   the claw projects out from only a part in a circumferential direction of the inner periphery to the center side of the case such that a fluid passage is formed through the claw to communicate a space formed between the annular seat and the seal holder with the action chamber.

2. The damper according to claim 1, wherein the claw has a surface on the action chamber side, the surface being tapered so as to incline in a direction opposite from the action chamber to the center side of the case.

3. The damper according to claim 1, wherein:
the case includes a large-diameter portion on the action chamber side and a small-diameter portion on a side opposite from the action chamber, an inner diameter of the small-diameter portion being smaller than an inner diameter of the large-diameter portion,
the oil seal is inserted into the small-diameter portion,
the seal holder is press-fitted to the large-diameter portion, and
the claws are formed into an arc shape or an annular shape, a diameter of a circle which connects inner peripheral ends of the claws being formed to be smaller than the inner diameter of the large-diameter portion and larger than the inner diameter of the small-diameter portion.

4. The damper according to claim 2, wherein the claw has a tapered portion, and
the tapered portion is formed at a position of an outer peripheral end of the seal holder in a radial direction of the rod.

* * * * *